United States Patent [19]

Greene

[11] Patent Number: 5,613,652
[45] Date of Patent: Mar. 25, 1997

[54] AIRCRAFT AUTO THROTTLE SYSTEM

[75] Inventor: Leonard M. Greene, Scarsdale, N.Y.

[73] Assignee: Safe Flight Instrument Corporation, White Plains, N.Y.

[21] Appl. No.: 327,040

[22] Filed: Oct. 21, 1994

[51] Int. Cl.$^6$ ............................ B64D 31/04
[52] U.S. Cl. .............. 244/75 R; 244/197; 244/234; 60/39.281
[58] Field of Search ............... 60/39.281; 244/234, 244/236, 197, 220, 221, 75 R; 192/41 R, 44

[56] References Cited

U.S. PATENT DOCUMENTS

| | | |
|---|---|---|
| 2,772,841 | 12/1956 | Bonsteel . |
| 3,140,843 | 7/1964 | Pettit ........................ 244/197 |
| 3,599,510 | 8/1971 | Scott, Sr. et al. . |
| 4,004,537 | 1/1977 | Nilsson . |
| 4,516,063 | 5/1985 | Kaye et al. . |
| 4,686,825 | 8/1987 | Cavasa et al. ........... 60/39.281 |
| 4,771,845 | 9/1988 | Shimizu . |
| 4,793,133 | 12/1988 | White et al. ............. 60/39.281 |
| 4,907,970 | 3/1990 | Meenen, Jr. . |
| 5,188,316 | 2/1993 | Dressler et al. . |
| 5,490,379 | 2/1996 | Wernberg et al. ........ 60/39.281 |

*Primary Examiner*—Galen L. Barefoot
*Attorney, Agent, or Firm*—David E. Dougherty

[57] ABSTRACT

An auto throttle system for FAYDEC equipped aircraft includes a remote friction element which is separated from a pilot's console. The system also includes an auto throttle control and a manual throttle control which are mechanically coupled through the friction element. The friction element provides the "feel" of a cable operated throttle system and allows a pilot to manually override the auto throttle without a significant change in the torque required to advance or retard the throttle. The system also includes a servo motor, gear drive and shaft with the friction element disposed on the shaft. A mechanical coupling connects the shaft and the manual control so that any changes caused by the auto throttle cause a corresponding change in a pilot's manual throttle control.

10 Claims, 2 Drawing Sheets

AIRCRAFT AUTO THROTTLE SYSTEM

FIELD OF THE INVENTION

This invention relates to an auto throttle system for aircraft which are equipped with full authority digital engine controls and more particularly to a system in which a remote friction element provides the "feel" of a cable operated throttle system and at the same time allows a pilot to manually override an autopilot without a significant change in the torque required for advancing or retarding the throttle.

BACKGROUND FOR THE INVENTION

In modern multi-jet engine aircraft, a pilot may manually control the engine power by means of the throttle control levers or quadrants. In such aircraft, the throttle control is integrated with the flight control system and under normal flight conditions controlled thereby. It is essential, however, that in an emergency situation, such as a windshear warning or tower command, that the pilot immediately take over control of the aircraft. It is also essential that the manual control lever be coupled to the flight control system when the system is in automatic operation so that the lever assumes and maintains the proper setting for any future manual take-over.

A prior art auto throttle system is described in the U.S. Patent of Dressler et al., No. 5,188,316. In that system, a clutch mechanism employs a combination of wedge and roller elements to provide a positive clutch engagement and disengagement in response to a switch actuated solenoid. The solenoid is manually actuated and deactuated by means of a switch on the control lever and in an emergency, the solenoid can be deactivated by a sharp "bump" movement of the lever. The "bump" or sudden movement causes the lever itself to actuate a microswitch which controls the solenoid.

In many of the more modern jet aircraft, the engine control is accomplished electronically or by fiber optics. In such systems, sometimes referred to as "fly by wire" or full authority digital engine control (FADEC), the position of the power levers is sensed by a rotary component and a signal is then transmitted to the full authority digital engine control. Since the power levers only drive a rotary sensor in such systems, there is little or no feel to the pilot as found in conventional control systems wherein the throttle lever moves a relatively long cable. For this reason, it has been customary to add a friction brake to the power levers to provide this feel.

One example of the addition of a friction dement is contained in the U.S. Pat. of Meenen, Jr., No. 4,907,970. In that example, a slip clutch is used to resist fore/aft movement, the clutch being adjustable for proper "feel" As disclosed therein, the feel is designed to accurately simulate the feel of a throttle control of an actual aircraft in a thrust control simulator.

It is now believed that there may be a significant market for an improved auto throttle system for FAYDEC equipped aircraft. It is believed that a significant market may exist for a throttle control system which incorporates a simple friction mechanism to provide for a servo input, to control the "feel" of a cable operated throttle control and in which the torque for moving the throttle control lever for and aft is essentially the same whether the servo is being overridden or not.

It is also presently believed that a throttle control system in accordance with the present invention has the aforementioned desirable features. Such systems may also be installed or FAYDEC equipped aircraft without disrupting the pilot's console. However, in a retrofit of such aircraft, it may be desirable to disconnect any brake which has been incorporated in the throttle mechanism. In addition, such throttle controls are believed to be of relatively compact size, of minimal weight, durable and relatively inexpensive to manufacture.

BRIEF SUMMARY OF THE INVENTION

An auto throttle system according to the present invention has been designed for aircraft which are equipped with full authority digital engine control, i.e., the so-called "fly by wire" aircraft. The system includes automatic means such as a speed control computer for controlling the power output of one or more engines. A manually operable means such as one or more throttle levers is also provided for controlling the power output of each of the engines. The system also includes a remote friction element or elements which are separated from the manually operable means, that is separated from the pilot's control console and/or throttle lever.

The auto throttle system also includes mechanical means for coupling the automatic means for controlling the power output of an engine and the manually operable means for controlling the power output of an engine through the friction element. The mechanical coupling of the automatic and manual control means through the friction element provides the feel of a cable based throttle system and allows the pilot to manually override the automatic means without significantly increasing the torque needed to advance or retard the throttle.

In a preferred embodiment of the invention, an auto throttle controls the output of a plurality of engines and the manually operable means includes a pilot console and a plurality of throttle control arms, one for each engine. A remote friction element such as a friction clutch is provided for each engine and is separated from the pilot's control console and/or throttle arms. A mechanical coupling connects a shaft which is driven by a servo motor in response to a signal from the automatic speed control to a rotary component which is connected to each of the throttle arms.

The invention will now be described in connection with the accompanying drawings wherein like numerals have been used to identify like parts.

DETAILED DESCRIPTION OF A PREFERRED EMBODIMENT OF THE INVENTION

Figure 1:
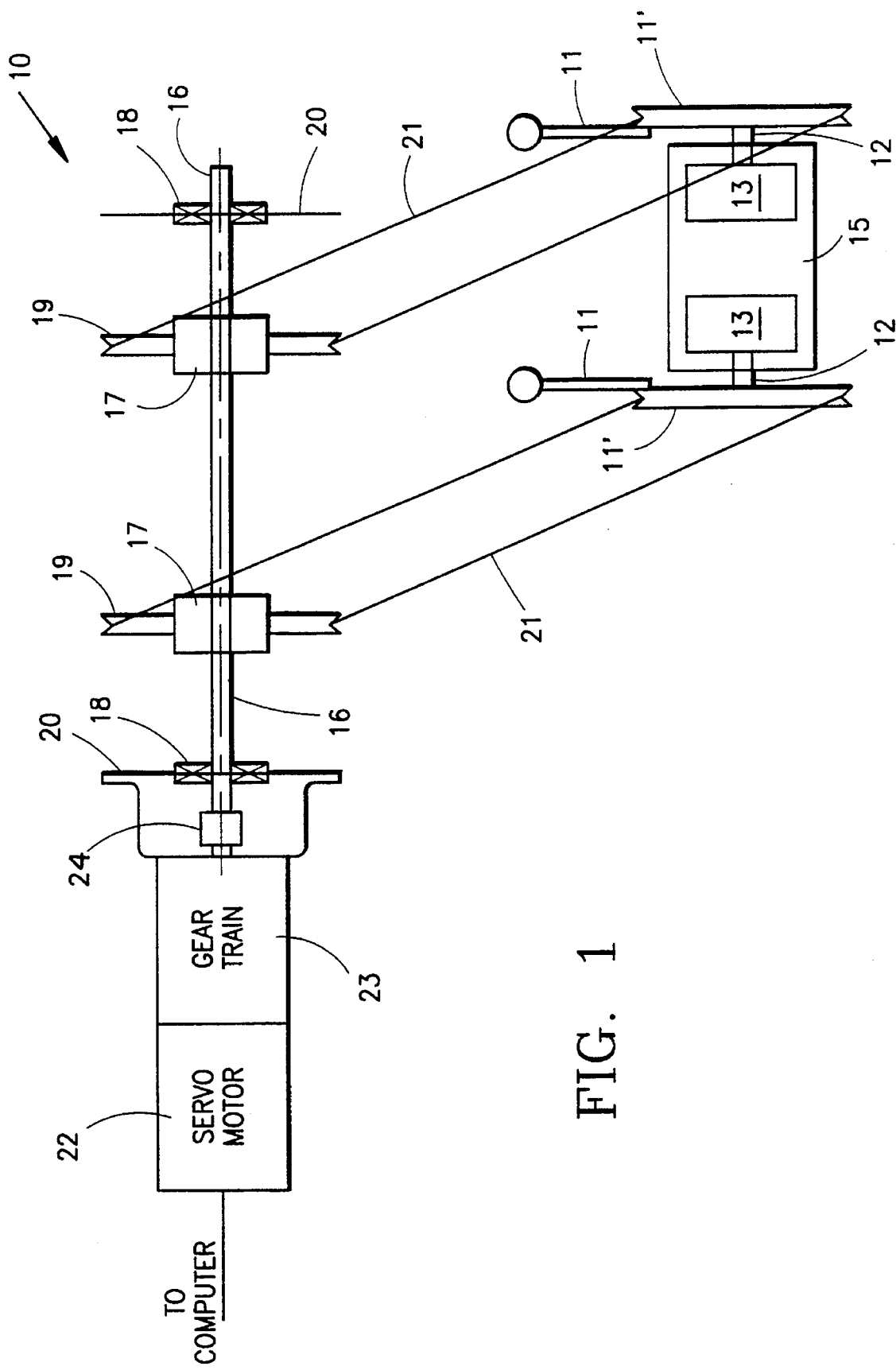
FIG. 1 is a schematic illustration of an auto throttle system in accordance with a preferred embodiment of the invention.
Figure 2:
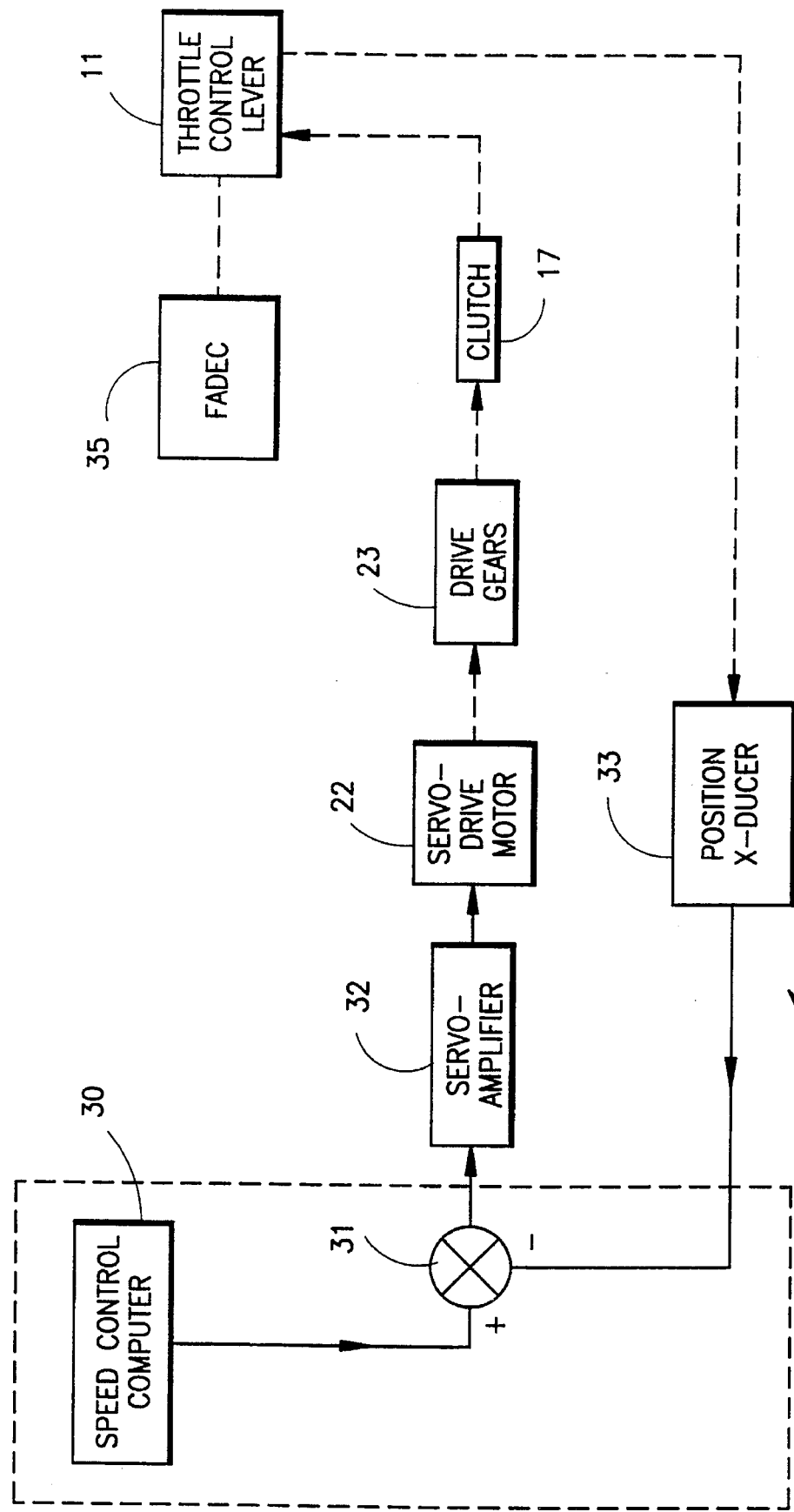
FIG. 2 is a functional block diagram which illustrates the preferred embodiment of the invention.

An auto power system 10 in accordance with a preferred embodiment of the invention is illustrated in FIGS. 1 and 2. As illustrated, the system 10 includes a pair of manually operable throttle control arms 11 which are operably connected to a pair of rotary sensors 13 by means of shafts 12. In practice, a throttle arm 11, shaft 12 and rotary sensor 13 are provided for each engine of the aircraft and contained in a pilot's console 15. As shown, each of the throttle arms 11 is connected to a rotatable element or pulley 11' which is adjacent to the pilot's console 15.

The rotary sensors 13 are constructed and arranged to generate a signal which is fed to the full authority digital engine control to indicate the position of the throttles. The rotary sensors 13 and signal generator are conventional as will be well understood by those skilled in the art.

A speed control computer 30 (see FIG. 2) is connected to a servo motor 22 which drives a gear train 23 in response to a signal from the computer 30. The speed control computer is of conventional design. The servo motor 22 and gear train 23 are connected to the shaft 16 by a conventional coupling 24. The shaft 16 is carded by a pair of beatings 18 which are disposed in a suitable support structure 20.

The friction elements 17 include a friction surface which engages a shaft 16 and which transmits the force from the servo input to an output member, pulley or sheave 19. Each of the sheaves 19 are mechanically connected to a pulley 11' by means of an endless belt 21 or the like. Any suitable mechanical linkage between the friction element 17 and throttle arm 11 may be used.

A servo input can be overridden by applying a force to overcome that force due to the friction surface of element 17 and is essentially the same when the servo 22 is rotating shaft 16 as it is when the shaft 16 is stationary.

In the operation of the system 10, a throttle control signal is generated by a speed control computer 30 (shown in FIG. 2). The signal is then fed to a summing device 31. A separate signal representing the position of the throttle control lever 11 is generated by a position transducer 33 and fed to the summing device 31 for comparison with the signal from the speed control computer 30. The output of the summing device 31 is then fed to the servo amplifier 32 which provides a drive signal for the servo drive motor 22. The mechanical output of motor 22 drives the drive gears or gear train 23 which, in turn, rotates shaft 16. The shaft 16 then advances the control lever 11 through the friction element or clutch 17. The position of the throttle control lever and the control of the throttle is thus effected in response to the throttle control signal generated by the speed control computer 30.

Under certain circumstances, a pilot may want to override the automatic throttle control. If, for example, an aircraft on approach encounters a sudden sustained increase in airspeed, the auto throttle would reduce engine thrust. However, if the sudden increase in airspeed is accompanied by a windshear warning, the pilot would immediately advance the throttle. Under such circumstances, there would be no need to throw a switch or disengage a clutch. The pilot would merely push the throttles forward and override the force of the friction element 17.

In a FADEC equipped aircraft, there is no drag or resistance to throttle movement due to lengthy cables running between a pilot's console and each engine. Thus, the only resistance is due to a rotary component or sensor and is therefore minimal. In the prior art, "feel" may be provided by a friction brake which is applied to a throttle lever or its linkage. However, the use of a remote friction element 17 in the present invention provides the "feel" of a cable connected throttle advance. Thus, any movement of the throttle control arm 11 requires the same torque whether the servo or a pilot is operating the throttle levers.

In a throttle control system for conventional aircraft, the drag which is inherent in a cable operated system may require a force of 10 or more pounds to advance or retard the throttle lever. Therefore, conventional auto control systems are disconnected during manual control. Disconnecting the auto control avoids a summation of force that could make it difficult for a pilot to respond in an emergency. However, in the system according to the present invention, a friction clutch applies the only resistance to advance or retard the throttle. Therefore, any difference between the force required to advance or retard the throttle when the auto pilot is on or off is essentially equal.

In a further embodiment of the invention, the speed control computer may respond to a slow/fast indicator. In such circumstances, there is no need for a feedback indicating the throttle position. Accordingly, the position transducer 33 and summing device 31 would be eliminated.

While the invention has been described in connection with a preferred embodiment, it should be clearly understood that changes and modifications may be made therein without departing from the scope of the appended claims.

What is claimed is:

1. An auto throttle system for aircraft equipped with a full authority digital engine control comprising:

automatic means for controlling the power output of an engine;

manually operable means for controlling the power output of the engine;

a remote friction clutch which is separate from said manually operable means; and mechanical means coupling said automatic means for controlling the power output of an engine and said manually operable means for controlling the power output of an engine through said friction clutch and for providing the feel of a cable based throttle system and allowing the automatic means for controlling the power output of the engine to be overridden by the manually operable means for controlling the power output of the engine without a significant increase in torque.

2. An auto throttle system according to claim 1 in which said manually operable means for controlling the power output of an engine includes a pilot's control console and throttle control arm and in which said friction element is separated from said pilot's control console.

3. An auto throttle system according to claim 2 in which said automatic means is coupled to said manual means by a servo driven shaft.

4. An auto throttle system according to claim 3 in which said shaft is mechanically coupled to said servo through a gear train.

5. An auto throttle system according to claim 2 which includes output means associated with said pilot's console for transmitting a signal representing the position of said throttle control arm to the full authority digital engine control.

6. An auto throttle system for multi-engine aircraft equipped with full authority digital engine control comprising:

automatic means for controlling the power output of a plurality of engines;

manually operable means for controlling the power output of the engines, including a pilot's console and a plurality of throttle control arms;

a plurality of remote friction clutches, one of said clutches for each of the engines which is separated from said pilot's control console; and mechanical means for coupling said automatic means for controlling the power output of the plurality of engines and said manually operable means for controlling the power output of the engines through said friction clutches and for providing the feel of a cable based throttle system and allowing the automatic means for controlling the power output of the plurality of engines to be overridden by the manually operable means for controlling the power output of the engines without a significant increase in torque.

7. An auto throttle system according to claim 6 which includes output means associated with said pilot's console for transmitting a signal representing the position of each of said throttle control arms to the full authority digital engine control.

8. An auto throttle system according to claim 7 which includes a rotary component for sensing the position of each of said throttle arms.

9. An auto throttle system for an aircraft which is equipped with full authority digital engine control comprising:

- a speed control computer for generating a signal in response to an input signal and changes in the flight characteristics of the aircraft;
- a manual throttle control for controlling the power output of an engine by means of an electromagnetic coupling;
- a rotatable shaft, a servo motor and gear train coupled to said shaft for rotating said shaft in response to a signal from said speed control;
- a friction clutch engaging said rotatable shaft;
- mechanical means coupling said rotatable shaft through said friction element to said manual throttle control so that said manual throttle control is advanced or retarded in response to a signal from said speed control; and
- means acting through said friction clutch for providing the feel of a cable based throttle and for manually overriding any positioning of the manual throttle control by said shaft without any significant increase in the torque required to initially position the manual throttle control.

10. An auto throttle system according to claim 9 in which said friction clutch can be disengaged to thereby disengage the coupling between said rotatable shaft and said manual throttle control.

* * * * *